United States Patent
Sandberg et al.

(10) Patent No.: US 10,064,063 B2
(45) Date of Patent: Aug. 28, 2018

(54) METHOD AND APPARATUS FOR AUTHENTICATING DIGITAL INFORMATION

(75) Inventors: Peter Sandberg, Værløse (DK); Mark S. La Pensee, Guildford (GB); Marcin Szydelko, Cracow (PL); Niels-Henrik Valentin, Hørsholm (DK); Mark J. Wealleans, Andover (GB)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 297 days.

(21) Appl. No.: 14/423,634

(22) PCT Filed: Aug. 24, 2012

(86) PCT No.: PCT/PL2012/000072
§ 371 (c)(1),
(2), (4) Date: Feb. 24, 2015

(87) PCT Pub. No.: WO2014/031015
PCT Pub. Date: Feb. 27, 2014

(65) Prior Publication Data
US 2016/0249221 A1    Aug. 25, 2016

(51) Int. Cl.
*G06F 7/04* (2006.01)
*H04W 12/10* (2009.01)
(Continued)

(52) U.S. Cl.
CPC ........... *H04W 12/10* (2013.01); *H04W 12/04* (2013.01); *H04W 12/06* (2013.01); *H04W 72/04* (2013.01); *H04L 63/18* (2013.01); *H04W 84/08* (2013.01)

(58) Field of Classification Search
CPC ... H04L 63/08; H04L 63/083; H04L 63/0861; H04L 63/18; G06F 21/31; H04W 12/06;
(Continued)

(56) References Cited

U.S. PATENT DOCUMENTS

| | | |
|---|---|---|
| 6,005,936 A | 12/1999 | Shimizu et al. |
| 7,071,835 B2* | 7/2006 | Odinak .................. H04L 9/085 |
| | | 340/12.32 |

(Continued)

FOREIGN PATENT DOCUMENTS

| | | |
|---|---|---|
| DE | 10 2006 005 177 A1 | 8/2007 |
| WO | 2012/021284 A2 | 2/2012 |

OTHER PUBLICATIONS

"AXON Evidence.com," Retrieved from the Internet URL: https://login.evidence.com/?class=UIX&proc=Login&return_url=%2f%3fcl%3dUIX%26pr%3dDashboard, on Feb. 26, 2016, © 2016 TASER International, Inc., pp. 1-1.
(Continued)

*Primary Examiner* — Abiy Getachew

(57) ABSTRACT

An apparatus and method for authenticating digital data is described. The method comprises generating the digital data with a radio device that operates on a narrowband channel and associating metadata to the digital data, the metadata being unique to the digital data. Further, a predefined function is applied to both the digital data and the associated metadata to generate an authentication key, and the authentication key is transmitted for storage at a remote server via the narrowband channel. The digital data is then authenticated using the stored authentication key.

23 Claims, 5 Drawing Sheets

(51) Int. Cl.
*H04W 12/04* (2009.01)
*H04W 12/06* (2009.01)
*H04W 72/04* (2009.01)
H04L 29/06 (2006.01)
H04W 84/08 (2009.01)

(58) Field of Classification Search
CPC ..... H04W 12/04; H04W 12/10; H04W 72/04; H04W 84/08
USPC .......................................................... 726/7
See application file for complete search history.

(56) References Cited

U.S. PATENT DOCUMENTS

| | | | |
|---|---|---|---|
| 7,197,143 B2 * | 3/2007 | Duerr | G11B 19/122 |
| | | | 380/229 |
| 7,251,343 B2 | 7/2007 | Dorrell et al. | |
| 7,293,098 B2 | 11/2007 | Sandhu et al. | |
| 7,797,535 B2 | 9/2010 | Sakai | |
| 7,929,943 B2 | 4/2011 | Begeja et al. | |
| 7,966,317 B2 | 6/2011 | Otake et al. | |
| 7,984,300 B2 | 7/2011 | Fredlund et al. | |
| 8,032,758 B2 | 10/2011 | Tian | |
| 8,051,169 B2 | 11/2011 | Rhoads | |
| 8,056,822 B2 | 11/2011 | Bourrieres et al. | |
| 8,086,867 B2 | 12/2011 | Freeman et al. | |
| 8,095,537 B2 | 1/2012 | Wolff et al. | |
| 9,247,024 B2 * | 1/2016 | Talstra | G06F 21/10 |
| 2002/0136400 A1 * | 9/2002 | Askerov | H04L 9/065 |
| | | | 380/28 |
| 2004/0022523 A1 * | 2/2004 | Duerr | G11B 19/122 |
| | | | 386/231 |
| 2004/0193893 A1 * | 9/2004 | Braithwaite | G06F 21/32 |
| | | | 713/186 |
| 2005/0132200 A1 | 6/2005 | Jaffe et al. | |
| 2006/0235729 A1 * | 10/2006 | Braithwaite | G06F 21/32 |
| | | | 705/3 |
| 2007/0053513 A1 * | 3/2007 | Hoffberg | G06K 9/00369 |
| | | | 380/201 |
| 2007/0266252 A1 | 11/2007 | Davis et al. | |
| 2008/0168542 A1 | 7/2008 | Sato | |
| 2010/0124353 A1 * | 5/2010 | Cohen | H04N 19/176 |
| | | | 382/100 |
| 2011/0047517 A1 | 2/2011 | Lee et al. | |
| 2011/0289306 A1 * | 11/2011 | Khosravi | G06F 21/567 |
| | | | 713/2 |
| 2012/0027312 A1 | 2/2012 | Horner et al. | |
| 2012/0240240 A1 * | 9/2012 | Naslund | H04L 63/0428 |
| | | | 726/26 |

OTHER PUBLICATIONS

"Canon : Image Encryption—OSK-E3," Retrieved from the Internet URL: http://www.canon.co.jp/imaging/osk/osk-e3/encryption/example/index.html, retrieved on Feb. 26, 2016, © Canon Inc. 2008, pp. 1-3.

Wen, V-Y. et al., "Image authentication for digital image evidence," Forensic Science Journal, vol. 5, 2006, pp. 1-11.

Yang, C.C. and Ng T.D., "Analyzing content development and visualizing social interactions in web forum," IEEE International Conference on Intelligence and Security Informatics, Jun. 17-20, 2008, ISI 2008, pp. 25-30.

International Search Report and Written Opinion for corresponding International Patent Application No. PCT/PL2012/000072, dated May 29, 2013.

International Preliminary Report on Patentability for corresponding International Patent Application No. PCT/PL2012/000072, dated Feb. 24, 2015.

* cited by examiner

METHOD AND APPARATUS FOR AUTHENTICATING DIGITAL INFORMATION

FIELD OF THE DISCLOSURE

The present disclosure relates generally to communication devices operating over narrowband networks, and more particularly to the authentication of digital information on communication devices operating over narrowband networks.

BACKGROUND

Communication devices, particularly portable communication devices such as handheld two-way radios, are being increasingly used in the transmission of digital data such as image data, audio data, video data, and other digital information. To submit digital images, or other digital media for evidentiary purpose, some form of validation must be provided to indicate that the digital data is authentic and has not been tampered with. Such authentication may be achieved, for example, by adding a watermark to the digital data, creating a digital fingerprint, or encrypting the digital data.

It may also be beneficial to move the digital data to a secure holding area soon after the digital data is created to reduce any risk of the data being tampered with. The process of moving data to a secure holding area often involves moving a large amount of data associated with the image, supporting metadata and the digital fingerprint or watermark across a communications link where it can be securely stored. Transferring large amounts of data is typically not a problem with high bandwidth communication systems, however in narrowband systems, for example, Terrestrial Trunked Radio (TETRA) communication systems, the data bandwidth is limited thereby forcing users to utilize a less secure public network such as a 3G network to transfer digital data. Alternatively, the digital data can remain stored on the communication device, but the increased risk of image tampering makes this an unattractive option.

Accordingly, there is a need for communication devices, such as handheld two-way radios, to be able to authenticate and transfer secure digital data over narrowband networks.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

Figure 1:
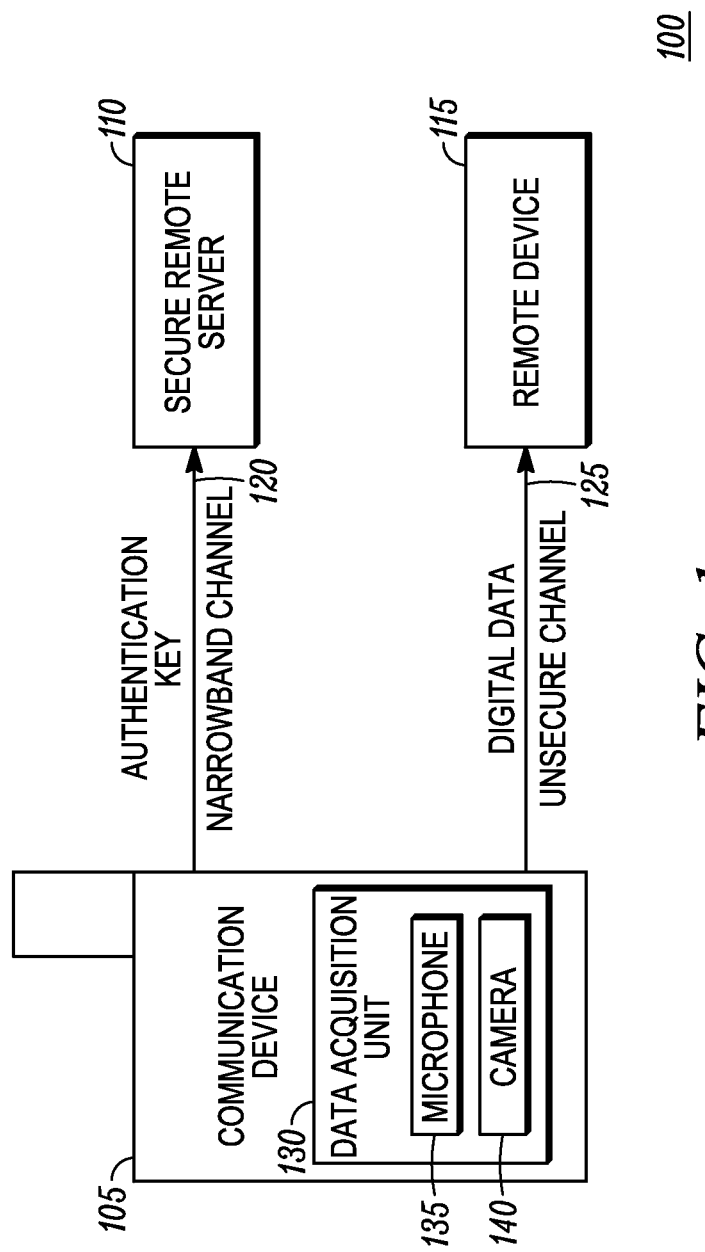
FIG. 1 is a diagram illustrating a communication system in accordance with the various embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Briefly, there is described herein, a method and apparatus by which digital data such as image data, audio data, video data, or any other digital information can be authenticated on a portable communication device, and the authenticated data sent over a bandwidth limited communications channel (for example, in TETRA systems) for secure storage, while the original data remains on the portable communication device for later extraction or for sending over a higher bandwidth link. The various embodiments to be described herein provide for linking the digital data to the user, location, communication device etc. and creating separate small sized evidence files which can be sent to a secure location over a narrowband connection.

FIG. 1 is a diagram illustrating a communication system 100 comprising a communication device 105, a secure remote server 110, and a remote device 115 in accordance with the various embodiments. The communication device 105 can be any two-way portable radio device operating in a narrowband network. The communication device 105 has the capability of generating digital data and metadata through a data acquisition unit 130 comprising a microphone 135 and a camera 140. In accordance with the various embodiments, the data acquisition unit 130 can be coupled with the communication device 105, as shown in FIG. 1, or alternatively can be a separate entity coupled to the communication device 105 (not shown). The digital data can be an image data, audio data, video data, or any other digital information. Whenever the digital data or any other digital information is created by the communication device 105, the digital data is tagged with appropriate information (for example, metadata) that can be used to verify that the digital data has been taken on a certain communication device, at a certain time, by a certain user. The appropriate information herein referred as metadata can be at least one of an air interface address of the communication device, a unique identifier of the communication device, time stamp associated with the generation of the digital data, location of the communication device, or identity of a user operating the communication device.

The communication device 105 applies a predefined function on the digital data and the metadata to generate an authentication key. In accordance with various embodiments, the predefined function can be any digital hash function that, when applied to the digital data and the metadata generates a small sized evidence file referred as authentication key. The authentication key can also be referred as hash key or digital media signature (DMS). The communication device 105 is capable of wirelessly communicating with the secure remote server 110 over a radio channel 120. In accordance with the various embodiments, the radio channel 120 is any secure or clear narrowband channel implemented in accordance with the Terrestrial Trunked Radio (TETRA) standard. The communication device 105 upon generation of the authentication key, transmits the authentication key to a secure storage area, such as secure remote server 110, via the radio channel 120. In accordance with the various embodiments, the secure remote server 110 can be any server managed and controlled by the user or any trusted party. Further, the digital data may remain in the communication device 105 or can be transferred over a separate channel 125 (such as 3G, WiFi, or any other unsecured wireless channel) at a later time.

In accordance with the various embodiments, there is no need for the authentication key and the digital data to be stored at the same location. Whenever needed, the authentication key and the digital data can be retrieved and used to validate the authenticity of the digital data by applying the predefined function on the digital data and the metadata and then comparing the results with the stored authentication key. Any attempt to manipulate the digital data or change the metadata will fail this check, and the digital data will be considered as tampered with or not authenticated.

Figure 2:
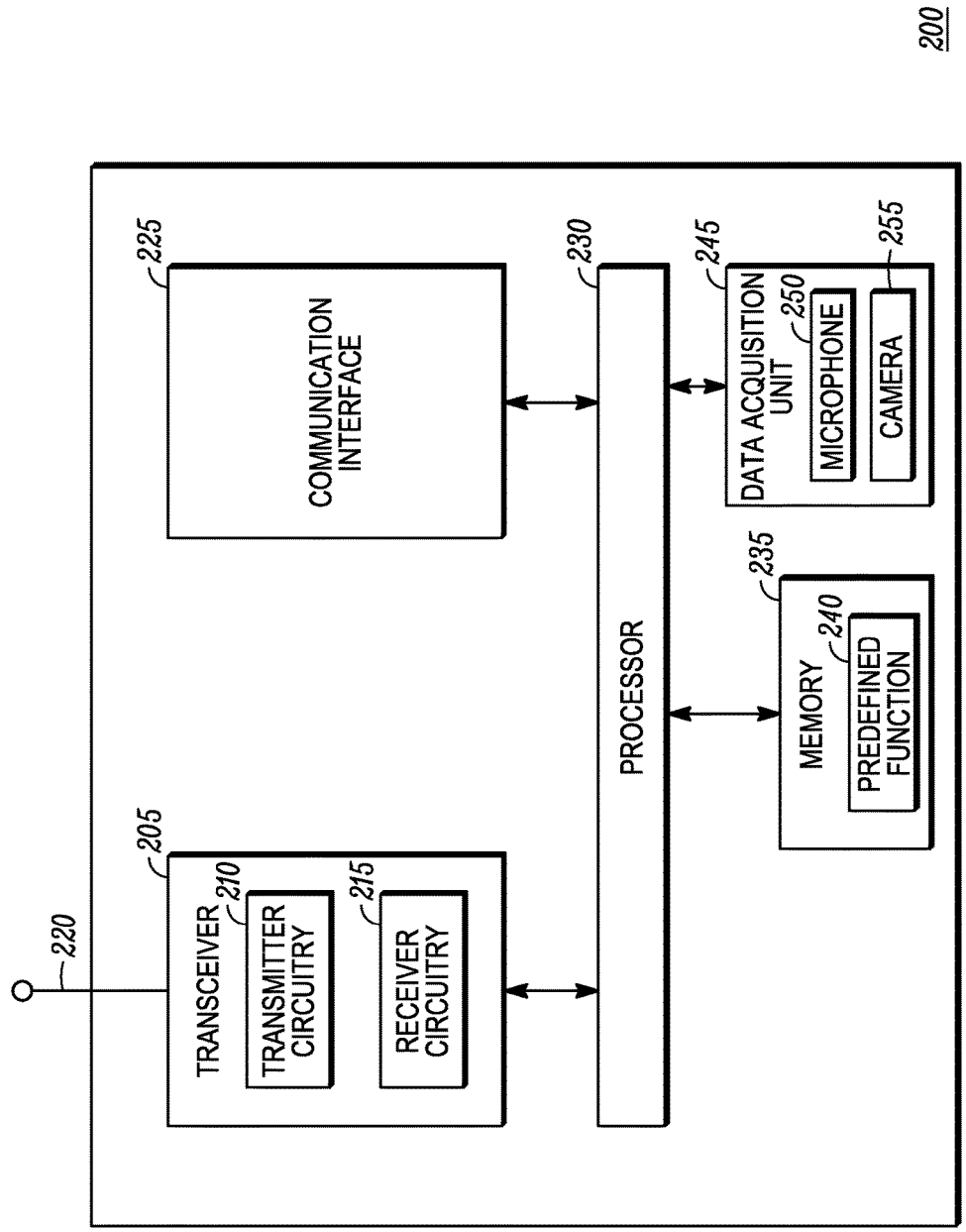
FIG. 2 is a block diagram of an apparatus in accordance with the various embodiments of the present disclosure.

FIG. 2 is a block diagram of an apparatus 200 for operation within the communication system 100 of FIG. 1 in accordance with the various embodiments. The apparatus 200 can be implemented in the communication device 105. The apparatus 200 comprises a transceiver 205 including transmitter circuitry 210 and receiver circuitry 215, an antenna 220, a communication interface 225, a processor 230, a memory 235 for storing a predefined function 240 that is executed by the processor 230, and a data acquisition unit 245 including a microphone 250 and a camera 255. In accordance with various embodiments, the data acquisition unit 245 is same as the data acquisition unit 130 that can be coupled within the communication device 105, as shown in FIG. 1, or alternatively can be a separate entity coupled to the communication device 105 (not shown). The apparatus 200 is an integrated unit containing at least all the elements depicted in FIG. 2, as well as any other elements necessary for the apparatus 200 to perform its particular function of generating the digital data and the metadata. Alternatively, the apparatus 200 can comprise a collection of appropriately interconnected units or devices, wherein such units or devices perform functions that are equivalent to the functions performed by the elements of the apparatus 200.

The transmitter circuitry 210 and the receiver circuitry 215 enable the apparatus 200 to communicate data to, and acquire data from, other devices in the communication system 100. In this regard, the transmitter circuitry 210 includes appropriate circuitry to transmit the authentication key and the digital data to the secure remote server 110 and the remote device 115 respectively. In accordance with various embodiments, the transceiver 205 enables the apparatus 200 to communicate over narrowband channel and an unsecured channel. The receiver circuitry 215 is capable of receiving data over various secured as well as unsecured channels. The transmitter circuitry 210 and the receiver circuitry 215 may together form a wireless transceiver to enable bi-directional wireless communication with other devices using the antenna 220.

The apparatus 200 further comprises a data acquisition unit 245 including a microphone 250 and a camera 255. The data acquisition unit 245 receives analog information regarding the captured data from the microphone 250 and the camera 255 and converts the analog information to the digital data for processing by the processor 230. The processor 230 includes one or more microprocessors, microcontrollers, DSPs (digital signal processors), state machines, logic circuitry, or any other device or devices that process information based on operational or programming instructions. In accordance with various embodiments, the processor 230 receives digital data and the metadata associated with the digital data from the data acquisition unit 245 and generates an authentication key using a predefined function. In accordance with the various embodiments, the predefined function used to generate the authentication key is stored in the memory 235.

Figure 3:
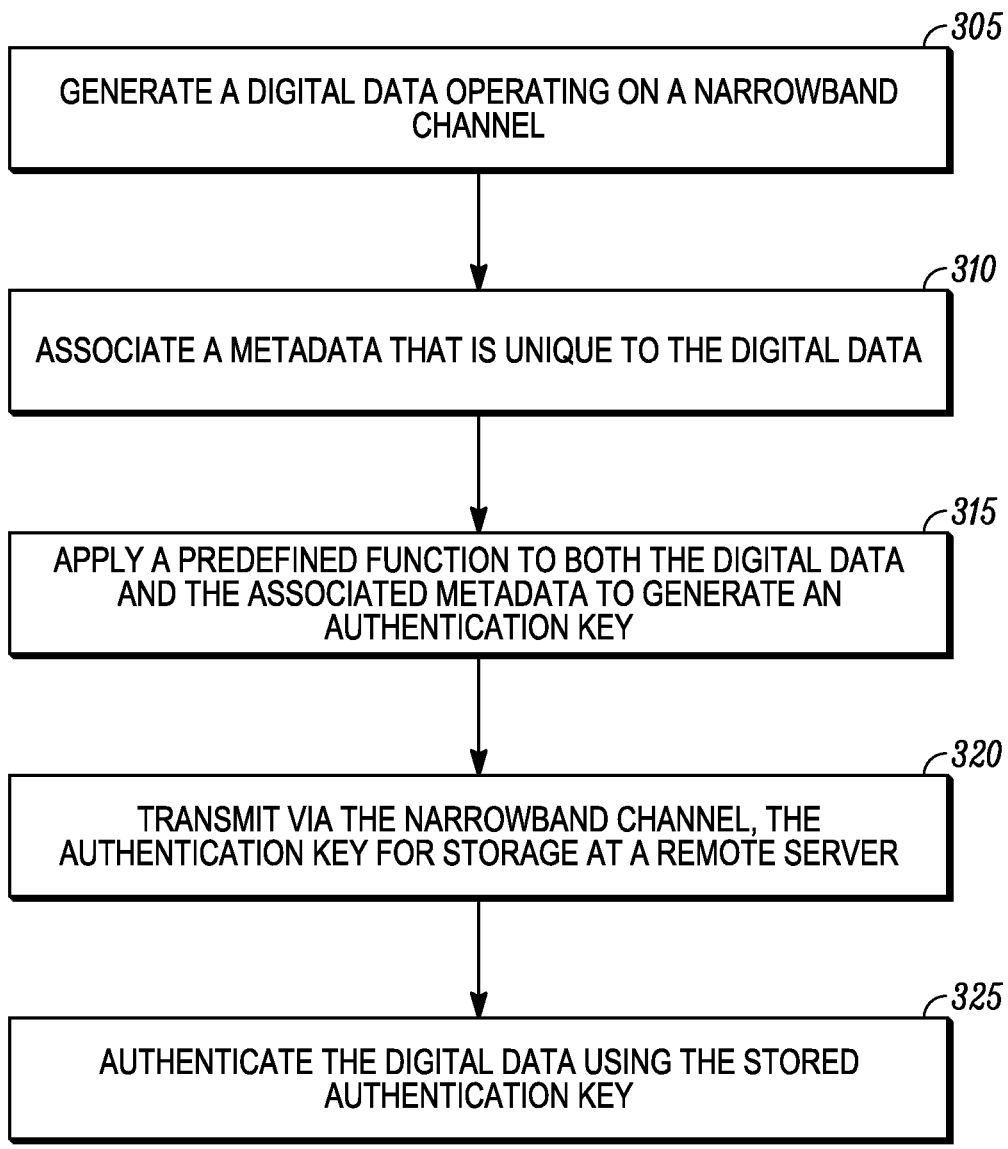
FIG. 3 is a flowchart illustrating a method for authenticating digital information on a communication device in accordance with the various embodiments of the present disclosure.

FIG. 3 is a flowchart illustrating a method 300 for authenticating digital information on the communication device 105. At 305, the communication device 105 operating on a narrowband channel generates digital data. The digital data can be at least one of an, an audio, a video or any other digital information. In accordance with the various embodiments, the communication device 105 is equipped with a camera for capturing an image and a video. The communication device 105 can also be provided with a microphone for receiving an audio or the audio associated with the video, if any.

At 310, the communication device 105, upon generating the digital data, associates a unique metadata to the digital data. In accordance with the various embodiments, the metadata can be at least one of an air interface address of the communication device 105, a unique identifier of the communication device 105, time stamp associated with the generation of the digital data, location of the communication device 105, or identity of a user operating the communication device 105. Further at 315, the communication device 105, applies a predefined function to both the digital data and the associated metadata to generate an authentication key. In accordance with the various embodiments, the predetermined function can be a digital hash function that is applied to the digital data and the metadata to generate an authentication key (known as hash value or DMS).

At 320, the communication device 105 upon generating the authentication key, transmits the authentication key to a secure remote server 110 via the radio channel 120 for example, a narrowband channel such as 25 KHz channel used in TETRA systems. In accordance with the various embodiments, the narrowband channel is a clear or secure narrowband channel. The secure narrowband channel can be an encrypted narrowband channel that facilitates transmission of encrypted data to provide secure communication between communication device 105 and secure remote server 110. In accordance with the various embodiments, the secured remote server 110 could be any server managed and controlled by the user or any trusted party. Further, at 325, a device used to verify the authenticity of the digital data uses the stored authentication key in order to determine whether the digital data is tampered with or not.

Figure 4:
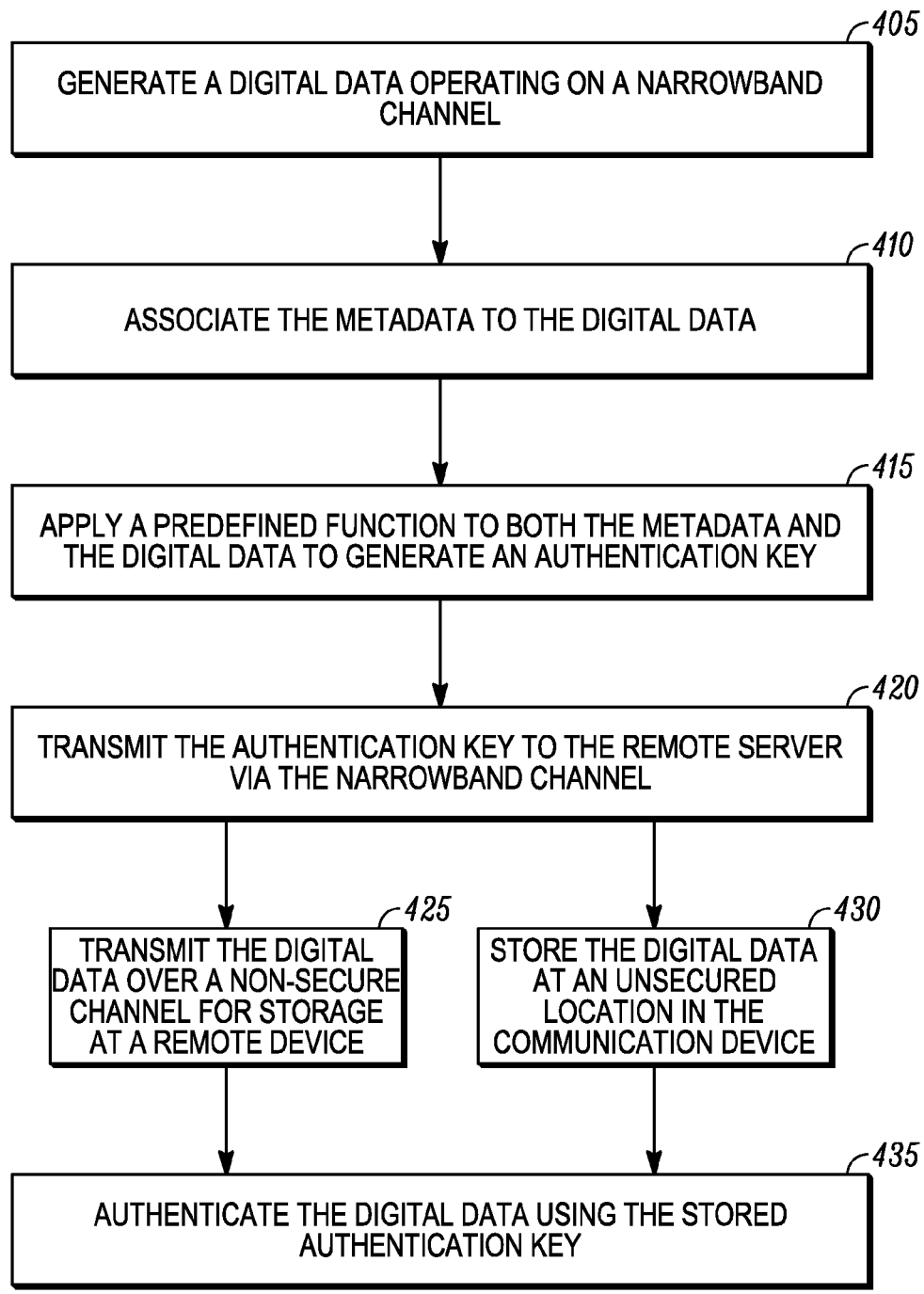
FIG. 4 is a detailed flowchart illustrating a method for authenticating digital information at the communication device in accordance with the various embodiments of the present disclosure.

FIG. 4 is a detailed flowchart illustrating a method 400 for authenticating digital information on the communication device 105 in accordance with the various embodiments. At 405, the communication device 105 operating on a narrowband channel generates a digital data. The digital data can be an image data, an audio data, a video data or any other digital information. In accordance with the various embodiments, the communication device 105 is equipped with a camera for capturing an image and a video. The communication device 105 can also be provided with a microphone for receiving an audio or the audio associated with the video, if any.

At 410, the communication device 105, upon generating the digital data, associate a unique metadata to the digital data. In accordance with the various embodiments, the metadata can be at least one of an air interface address of the communication device, a unique identifier of the communication device, time stamp associated with the generation of the digital data, location of the communication device, or identity of a user operating the communication device. Further at 415, the communication device 105, applies a predefined function to both the digital data and the associated metadata to generate an authentication key. In accordance with the various embodiments, the predefined function is a digital hash function that is applied to the digital data and the metadata to generate an authentication key (known as hash value or DMS).

At 420, the communication device 105 upon generating the authentication key, transmits the authentication key to a secured remote server 110 via the radio channel 120. In accordance with the various embodiments, the narrowband channel is a clear or secure narrowband channel. The secure narrowband channel can be an encrypted narrowband channel that facilitates transmission of encrypted data to provide secure communication between communication device 105 and secure remote server 110. In accordance with the various embodiments, the secured remote server 110 can be a server controlled and managed by the user or any trusted party. Further, the communication device 105 can either transmit the digital data over a non-secure channel 125 (for example, 3G, WiFi, or any narrowband or wideband channel) for storage at a remote device at 425 or store the digital data in an unsecured device at an unsecured location in the communication device 105 itself at 430. Further, at 435, the digital data is authenticated using the stored authentication key in order to determine whether the digital data is tampered with or not.

Figure 5:
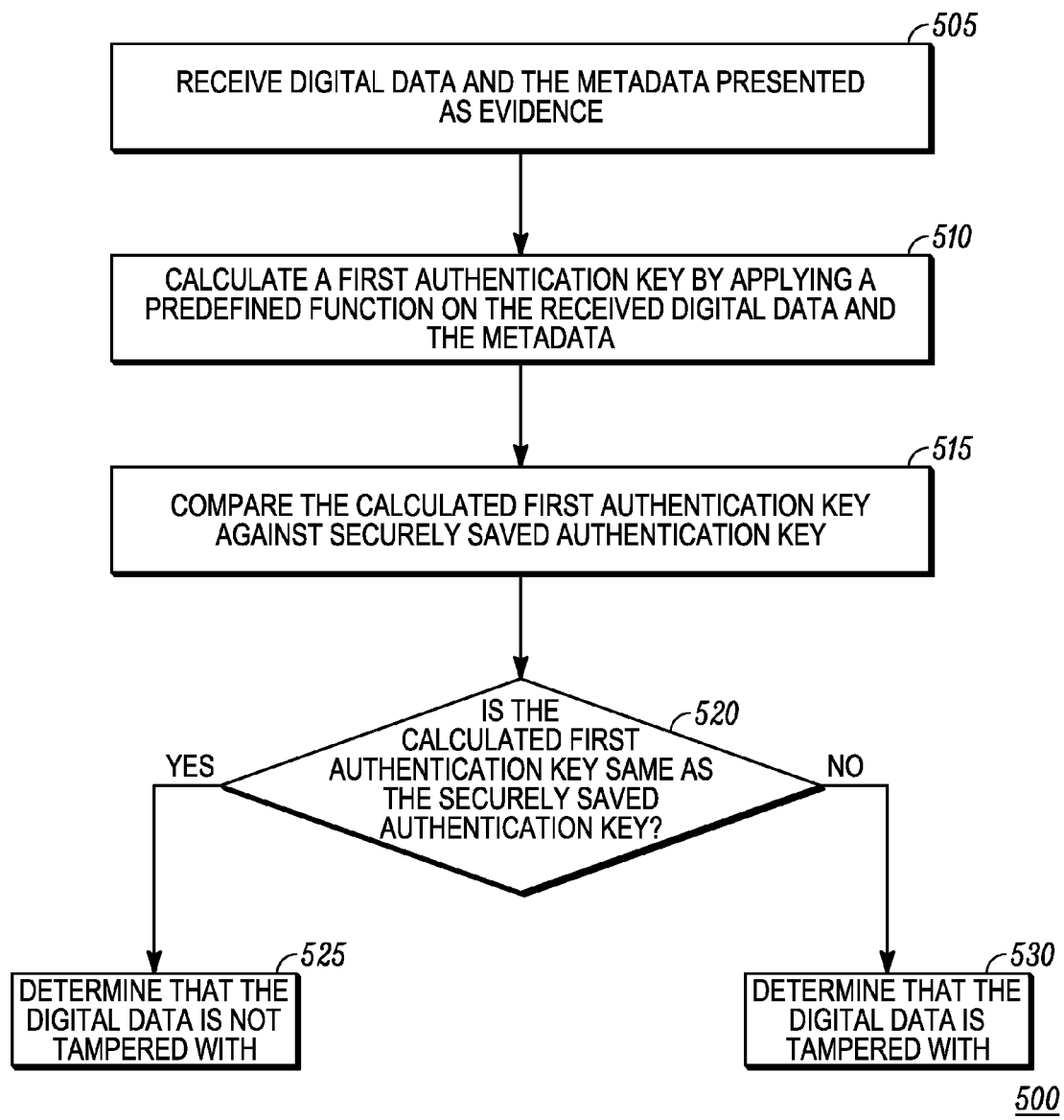
FIG. 5 is a flowchart illustrating a method for determining whether the digital information is tampered with in accordance with the various embodiments of the present disclosure.

FIG. 5 is a flowchart illustrating a method 500 for determining whether the digital information is tampered with in accordance with the various embodiments. At 505, a device used to authenticate the digital data receives the digital data and the metadata associated with the digital data as evidence. In accordance with the various embodiments, the device can be any radio or processor with a capability of processing the digital data and the metadata to determine whether the digital information is tampered with in accordance with the embodiments. As discussed above, the digital data can be any image data, audio data, video data, or other digital information generated by the communication device 105 and the metadata can be at least one of an air interface address of the communication device, a unique identifier of the communication device, time stamp associated with the generation of the digital data, location of the communication device, or identity of a user operating the communication device. The device upon receiving the digital data and the metadata calculates a new authentication key namely a first authentication key by applying a predefined function on the received digital data and the metadata at 510. In accordance with the various embodiments, the predefined function applied by the device on the received digital data and the metadata is same as the predefined function used by the communication device 105 to generate the authentication key.

At 515, the device compares the calculated first authentication key against the securely saved authentication key at the secure remote server 110. Further, at 520, the device determines if the calculated first authentication key is same as the securely saved authentication key or not. If the calculated first authentication key is same as the securely saved authentication key, then at 525 it is determined that the digital data is not tampered with. Else at 530, the digital data is determined to be tampered with.

The implementation of authentication key (known as hash value or DMS) into a narrowband portable device, such as a TETRA portable radio, along with a camera provides a solution for authenticating digital data that is highly advantageous over other data authentication devices, such as digital cameras and smartphone style radio operation. The authentication of digital data provided by the various embodiments overcomes the disadvantages of previously relied upon approaches, such as encryption of pictures, media storage, and/or full picture transmission to other locations, all of which are highly impractical especially in radio systems with limited bandwidth. The method and apparatus for authenticating digital data provided by the various embodiments beneficially maintains the generation of authenticating evidence but limits the amount of data that needs to be transmitted over the air to a secure storage location.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for authenticating digital data, comprising:
generating digital data with a communication device (105) that operates on a narrowband channel (120);
associating metadata to the digital data wherein the metadata is unique to the digital data;
applying a single predefined function to both the digital data and the associated metadata to generate a single authentication key;
transmitting, via the narrowband channel (120), the single authentication key for storage at a remote server (110); and
authenticating the digital data using the stored single authentication key.

2. The method of claim 1, further comprises storing the digital data within a memory (235) of the communication device (105).

3. The method of claim 1, wherein the metadata comprises at least one of an air interface address of the communication device (105), a unique identifier of the communication device (105), location of the communication device (105), or identity of a user operating the communication device (105).

4. The method of claim 1, wherein the narrowband channel (120) is implemented in accordance with a Terrestrial Trunked Radio (TETRA) standard.

5. The method of claim 1, further comprising storing the single authentication key securely in the communication device (105).

6. The method of claim 1, further comprises storing the digital data in an unsecured device at an unsecured location upon generation of the single authentication key or transmitting the digital data over a non-secure channel (125) for storage at a remote device (115) upon the generation of the single authentication key.

7. The method of claim 6, wherein the non-secure channel (115) is either a narrowband or a wideband channel.

8. The method of claim 6, wherein authenticating the digital data includes determining whether the stored digital data has been tampered with.

9. The method of claim 8, further comprising:
applying the single predefined function on the digital data and the metadata to generate a new single authentication key;
comparing the new single authentication key to the stored single authentication key; and
determining whether the digital data has been tampered with based upon whether the new single authentication key is same as the stored single authentication key.

10. The method of claim 1, wherein the digital data can be an image data, audio data, video data, or any other digital information.

11. A portable communication device (105) operating on a narrowband channel comprising:
a processor (230) configured to:
generate digital data at the portable communication device (105),
associate metadata to the digital data wherein the metadata is unique to the digital data, and
apply a single predefined function to both the digital data and the associated metadata to generate a single authentication key; and
a transceiver (220) coupled to the processor (230) configured to:
transmit, via the narrowband channel, the single authentication key for storage at a remote server (115) to enable single authentication of the digital data.

12. The portable communication device (105) of claim 11, further comprising a memory (235) configured to store the digital data within the portable communication device (105).

13. The portable communication device (105) of claim 11, wherein the metadata comprises at least one of an air interface address of the portable communication device (105), a unique identifier of the portable communication device (105), location of the portable communication device (105), or identity of a user operating the portable communication device (105).

14. The portable communication device (105) of claim 11, wherein the narrowband channel (120) is implemented in accordance with a Terrestrial Trunked Radio (TETRA) standard.

15. The portable communication device (105) of claim 12, wherein the memory (235) is further configured to store the single authentication key securely in the portable communication device (105).

16. The portable communication device (105) of claim 11, wherein the digital data is stored in an unsecured device at an unsecured location upon generation of the single authentication key or transmitted on a non-secure channel (125) for storage at a remote secure location upon generation of the single authentication key.

17. The portable communication device (105) of claim 16, wherein the non-secure channel (125) is either a narrowband or a wideband channel.

18. The portable communication device (105) of claim 16, wherein the authentication of the digital data includes determining whether the stored digital data has been tampered with.

19. The portable communication device (105) of claim 18, wherein the single authentication of the digital data comprises:
applying the single predefined function on the digital data and the metadata to generate a new single authentication key;
comparing the new single authentication key to the stored single authentication key; and
determining whether the digital data has been tampered with based upon whether the new single authentication key is same as the stored single authentication key.

20. The portable communication device (105) of claim 11, wherein the digital data can be an image data, audio data, video data, or any other digital information.

21. The portable communication device (105) of claim 11, wherein the single predefined function is a single digital hash function.

22. The method of claim 3, wherein the metadata further comprises timestamp associated with the generation of the digital data.

23. The portable communication device (105) of claim 13, wherein the metadata further comprises timestamp associated with the generation of the digital data.

\* \* \* \* \*